J. H. MORGAN.
PULLEY.
APPLICATION FILED DEC. 2, 1910.

1,193,177.

Patented Aug. 1, 1916.
6 SHEETS—SHEET 1.

Witnesses

Inventor
John H. Morgan
by
Attorneys

J. H. MORGAN.
PULLEY.
APPLICATION FILED DEC. 2, 1910.

1,193,177.

Patented Aug. 1, 1916.
6 SHEETS—SHEET 3.

Witnesses

Inventor
John H. Morgan by

Attorneys

J. H. MORGAN.
PULLEY.
APPLICATION FILED DEC. 2, 1910.

1,193,177.

Patented Aug. 1, 1916.
6 SHEETS—SHEET 4.

Witnesses

Inventor
John H. Morgan
by
Attorneys

J. H. MORGAN.
PULLEY.
APPLICATION FILED DEC. 2, 1910.

1,193,177.

Patented Aug. 1, 1916.
6 SHEETS—SHEET 5.

Witnesses

Inventor
John H. Morgan by

Attorneys

UNITED STATES PATENT OFFICE.

JOHN HENRY MORGAN, OF HARROGATE, ENGLAND.

PULLEY.

1,193,177.   Specification of Letters Patent.   Patented Aug. 1, 1916.

Application filed December 2, 1910. Serial No. 595,257.

*To all whom it may concern:*

Be it known that I, JOHN HENRY MORGAN, of The Grange, Harlow Oval, Harrogate, in the county of York, England, have invented new and useful Improvements in Pulleys, of which the following is a specification.

This invention relates to improvements in pulleys and driving drums which are used for imparting motion by means of belting or ropes, or the like from one shaft to another, or from rotating shafting to other shafting, or to a machine or machinery, which are formed wholly or partially out of stampings of sheet metal or T iron suitably rolled in sections which are placed around a boss so as to form the arms or rims of the pulley or drum.

The invention may be applied to split or other pulleys in which the whole of the pulley is formed out of stampings of sheet metal or T iron suitably rolled, or a portion thereof may be formed of sheet metal or T iron suitably rolled, and the arms or spokes of the pulley may be made wholly or partially solid.

The object of the present invention is to provide a light, yet strong, power or driving pulley without sacrificing any of the advantages of the ordinary pulley, and in which the pulley is constructed on what is termed the "keystone" principle—that is to say the spokes or arms of the pulley and its periphery are made of sections each in the form of a keystone and fastened to a hub, to which sections a plain or grooved band forming the periphery of the pulley may or may not be fixed.

The "keystone" sections of the pulley constructed according to this invention are formed out of blanks of sheet metal stamped to shape as hereinafter described and adapted so that the inner ends or portions of each section may either be fixed to the boss of the pulley or may be threaded through holes or apertures formed in the outside portions of the boss or shroud and in which provision is made for the insertion of a liner, or lining which acts as a support for the spokes or arms. The shroud and liner when used are also adapted to receive in addition to the hollow stamped spokes or arms other spokes either wholly or partially solid, which are capable of being threaded through the apertures or holes in the outer portion or shroud of the boss or arm whether or not they are constructed on the "keystone" principle.

In the drawings hereunto annexed are shown various methods for carrying this invention into practice, in which—

Like parts in all the views are marked with similar letters of reference.

Figure 1:
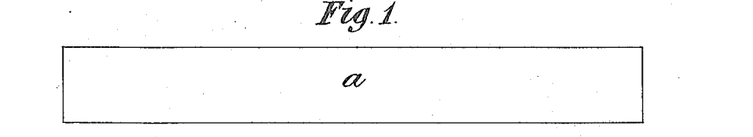
Figure 1. is a rectangular blank of sheet metal out of which a "keystone" section is formed.
Figure 2:
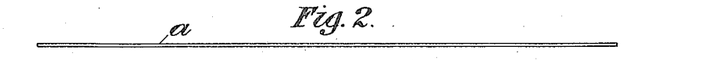
Fig. 2. is an elevation of the same.

$a$ is a blank of sheet metal, say sheet iron or sheet steel, of any suitable thickness, and made of any suitable length and width, or it may be a piece of T iron suitably rolled so as to form a central web having on each side thereof a flange, and the web to be indented as hereinafter described for the sheet metal stamping.

The blank $a$ is formed by stampings in dies in the ordinary manner to the shape shown in Figs. 3 to 6 with a central U or trough-shaped web $b$ having a number, say, three, or more, of V-shaped indents, or annular recesses $c$ formed therein. The sides or walls of the V-shaped indents are formed at any suitable angle to suit the shape of the boss or hub of the pulley to which they are to be applied. The faces of the said recesses $c$ are formed to meet together as a miter or other joint, and if desired a strengthening piece may or may not be formed out of the blank for strengthening the section at this point.

Figure 3:
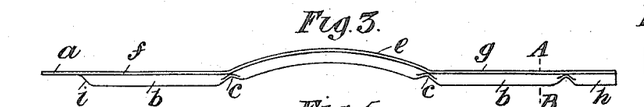
Fig. 3. an elevation showing the blank after it has undergone the first stamping or pressing operation.
Figure 4:
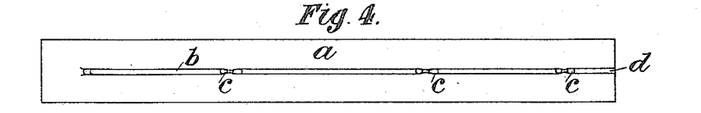
Fig. 4. a plan of the same looking at the top.
Figure 6:
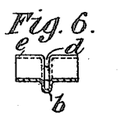
Fig. 6. a transverse section on line A, B, Fig. 3.

As will be seen in Fig. 6, the blank when stamped or formed into the shape shown in Fig. 3, has flanges formed on each side of the central web $b$, and on its upper surface is provided a recess or groove $d$, which, as shown in Fig. 4, extends from one end of the blank to near the opposite end. The central portion $e$, Fig. 3, of the blank is shown curved to suit the diameter or radius of the periphery of the pulley, and the two ends $f$ and $g$ of the same figure form half of each of the arms of the pulley when the blank is turned into the shape to form the "keystone" section shown in Fig. 7.

Figure 7:
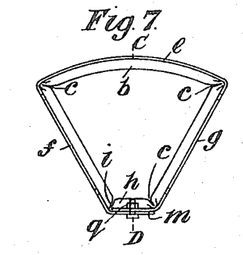
Fig. 7. is an elevation of a "keystone" section constructed according to one method of this invention.
Figure 8:
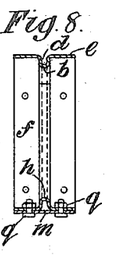
Fig. 8. is a section of the same on line C, D, Fig. 7.
Figure 9:
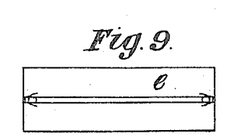
Fig. 9 is a plan looking on the top of Fig. 7.

It will be noted in Fig. 3, that the central rib does not extend to the end of the portion $f$, but that the said rib does extend to the end of $g$. The reason for this is that when the portion $h$ of the rib is turned over as shown in Fig. 7 the end $i$ of the rib then forms a butt or stop against which the extremity of the end $g$ can abut. The V-shaped recesses $c$ also form butt joints or stops for the upper end of the arms to abut against, while the bent portions of the sections may abut one upon each other.

Figure 5:
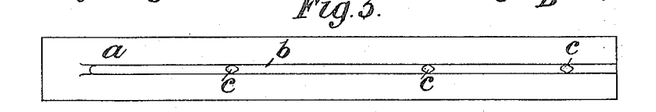
Fig. 5. a plan looking at the underside of Fig. 3.
Figure 12:
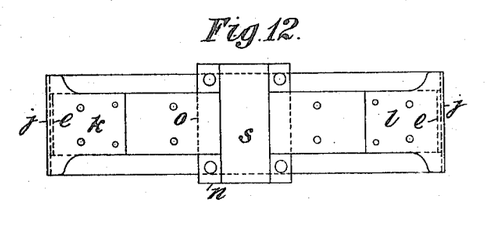
Fig. 12. is a plan of Fig. 10 after its upper portion has been removed.
Figure 13:
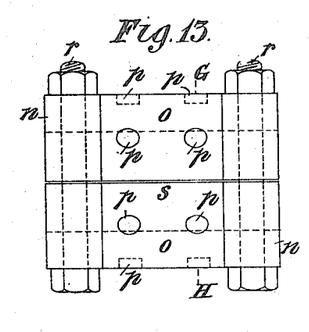
Fig. 13. is an elevation of the boss or hub of pulley shown in Fig. 10.
Figure 14:
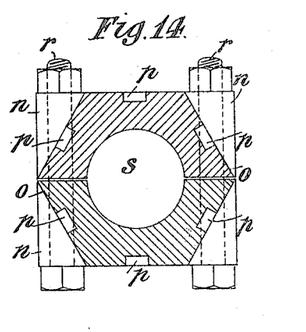
Fig. 14. is a section on line G, H, Fig. 13.
Figures 28, 29, 30, 31, 32, 33, 34, 35, 36, 37, 38, 39, 46, 47, 48, 49:
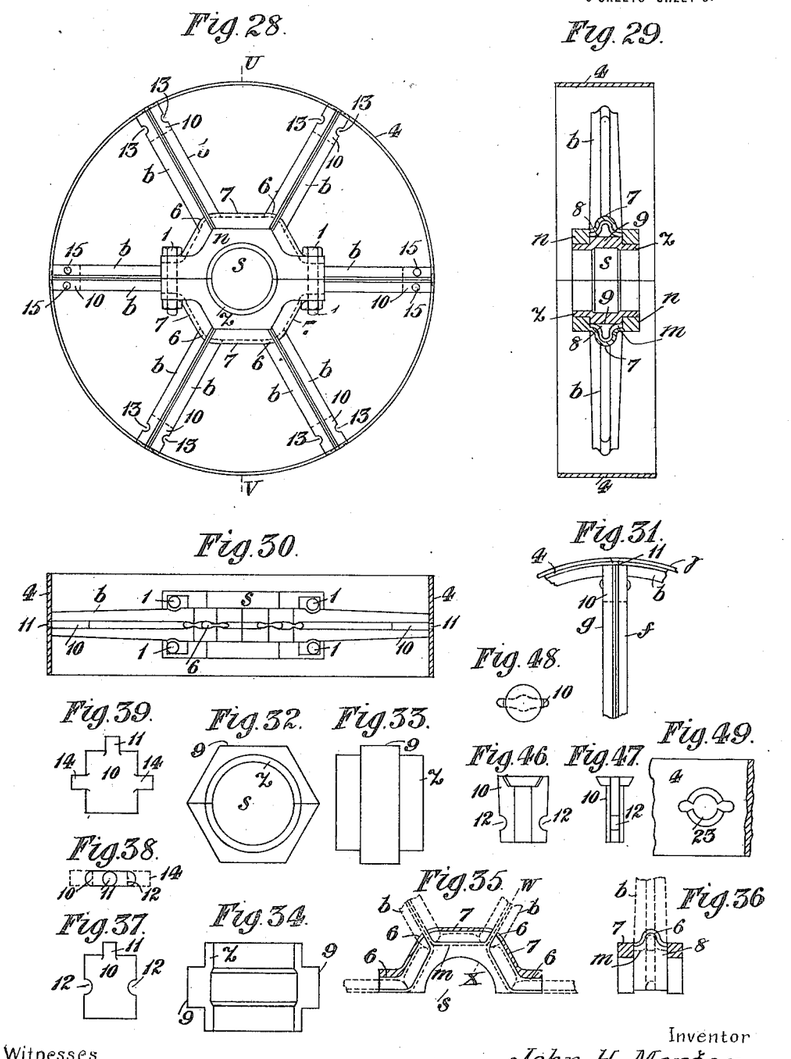
Fig. 28. is an elevation of a pulley constructed on the "keystone" principle having its arms threaded through apertures in its boss, or hub, and in which the boss or hub is provided with a liner.
Fig. 29. is a sectional elevation of the same on line U, V, Fig. 28.
Fig. 30. is a plan of Fig. 28 after the upper half has been removed.
Fig. 31. is a part elevation of a pulley arm with a loose rim showing the means of attaching the same together.
Fig. 32. is an elevation of the internal portion of the boss or hub, shown in Fig. 28.
Fig. 33. is an elevation of the same.
Fig. 34. is a plan of Fig. 32 after its upper half has been removed.
Fig. 35. is a longitudinal section of one half of the shroud.
Fig. 36. is a transverse section on line W, X, Fig. 35.
Fig. 37. is an enlarged elevation of a block for attaching the arms of a pulley to its rim.
Fig. 38. is a plan of the same.
Fig. 39. is a slightly modified form of block.
Fig. 46. is an enlarged front elevation of a modified form of fixing block.
Fig. 47. an end elevation of the same.
Fig. 48, a plan looking at the top.
Fig. 49. is a plan of the countersunk hole in the rim through which the block is passed.

It will readily be understood that if desired instead of making the section in one portion, as shown in Fig. 7, it may be divided into one, or more portions, as, for example, the portions $f$, $g$, and $h$ may be made in one part, while the curved portion $e$ may be, as will be hereinafter described, formed separately from the arms and base of the section, or if desired, the rim or curved portion $e$ may be divided into one or more portions, and have one arm or a portion thereof formed at one of its ends and the other portion of the arm or rim provided with an arm or portion formed in one of the two portions of the rim may be welded or otherwise connected together by any suitable means at their point of juncture. When the arm and portion of the rim are formed in one they may be united together at the base, as shown in Fig. 7. Also the ends $f$ and $g$ of the blank $a$ may either be of uniform width, as shown in Figs. 4 and 5, or they may be suitably shaped to form tapering or other shaped arms as shown in Figs. 12 and 29. The base $m$ may also be divided when required by any suitable means so as to facilitate fixing it in position, and when divided it may or may not, after being placed in position, be welded together by any suitable means, or the two portions may be arranged to abut against, or upon, each other. The central rib $b$ may also, if so desired, but not necessarily so, be made to taper in its length and width from its ends $h$ and $i$ to the V-shaped recesses or indents $c$ at the curved portion which forms the rim of the section.

Figure 10:
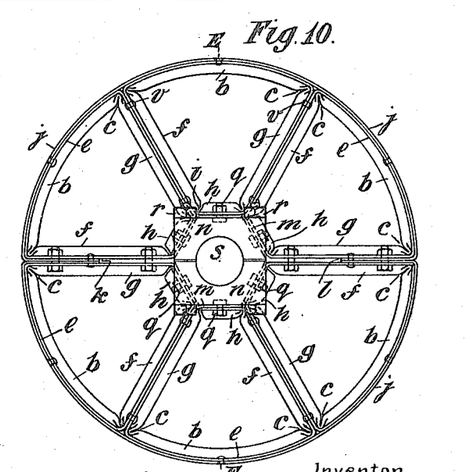
Fig. 10. is an elevation of a complete pulley.
Figure 11:
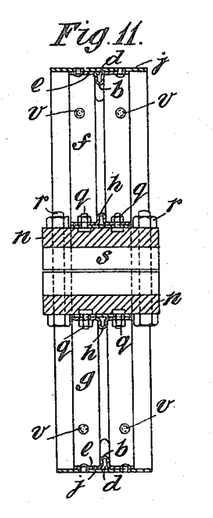
Fig. 11. is a section on line E, F, Fig. 10.

The curved portions of the several "keystone" sections when fitted together form a complete circle, as shown in Fig. 10, with hollow ribs and a central groove $d$ along the face or periphery of each section upon which the belt or cord is placed, or to the perimeter of the sections may be bolted, or riveted, a face $j$ of any suitable width. When the pulley is made in two halves, as shown in Fig. 10, then the ends of the portion $j$ may be turned inward and fit in between spaces of the two arms, as shown at $k$, $l$, Fig. 10, but in this case the peripheral plate $j$ would cover up the annular recess or indent $d$, and when the plate $j$ is dispensed with the said groove will aid in causing a belt to more firmly adhere to the rim of the pulley.

A "keystone" section as above described will be provided with a wide and curved base hereinafter termed "the portion" $e$ and with a much narrower apex $m$ which is formed as shown in Fig. 7 by the ends $f$ and $g$ of the blank being made to overlap each other, and this takes the form of an inverted triangle. The apex $m$ may be curved and a circular boss $n$ is employed or shaped to that of the boss to which it is applied, as for example, say, in size or shape each apex may be one-half, or one-fourth, or one-sixth, or one-eighth as the case may be of the circumference of the perimeter of the boss or hub to which the apex of each section is fixed, so that it may, if desired, be detachable therefrom, or may be cast thereon.

The sections are secured by their bases to, say, a hexagonal, or other polygonal hub or boss $n$, which, when the pulley is made in halves, will require to be split, but when the pulley is made with a boss in one piece, then the said boss may be arranged, say, to be cast on to the bases of the sections so as to envelop or inclose the said sections within it. In Figs. 10 to 14 the boss is shown to be square, but provided with central portions $o$ hexagonal in shape. The hexagonal shaped portion $o$ of each boss $n$ is made of the width required to receive the arms of the "keystone" shaped section and the said portion $o$ is also provided in each of its angles with two or more grooves or recesses $p$ to receive the heads of the bolts $q$ which are employed for bolting the horizontal turned over portions of the ends $f$ and $g$ of the blank together. Through the square shaped portions of the boss $n$ is passed, say, at each corner thereof, a bolt $r$. That is to say four bolts may be employed for fixing the two portions of the boss $n$ together. The boss or hub is also provided with a central hole $s$, which will vary in size or diameter according to the shaft upon which the pulley is to be fixed.

Figures 15, 16, 17:
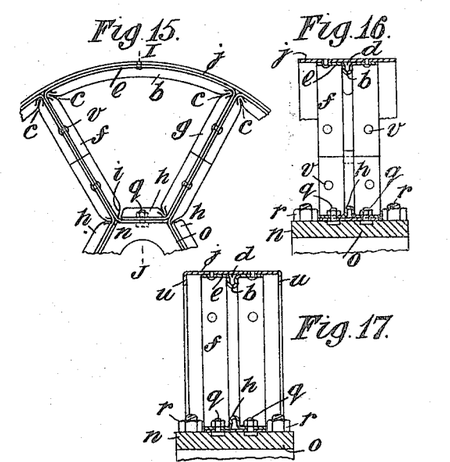
Fig. 15. is an elevation of a portion of a pulley having a butt joint and showing an additional rim or periphery for making the face of the pulley wider than the width of the "keystone" sections.
Fig. 16. is a sectional elevation on line I, J, Fig. 15.
Fig. 17. is a part sectional elevation of a pulley with a similar additional rim to that shown in Fig. 16 but with the edges of the rim bent over.
Figure 18:
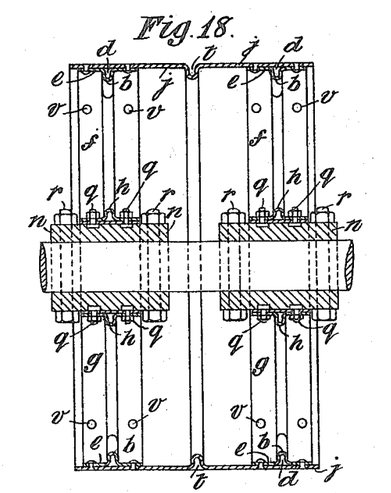
Fig. 18. shows a means of providing a pulley with a very broad face or periphery, and in which two complete sets of pulleys built up with "keystone" sections are employed.

When the rim $j$ is made separate from the said "keystone" sections it may be of any suitable width, and if desired it may be formed as shown in Fig. 18, of such a width as to be fixed to two pulleys constructed, say, as shown in Fig. 10, and in this case, it may, if so desired, be provided with one or more annular grooves $t$. Also, if desired, the outer edges of the rim $j$ are turned at a right angle to its periphery, as shown at $u$, $u$, Fig. 17.

Figure 24:
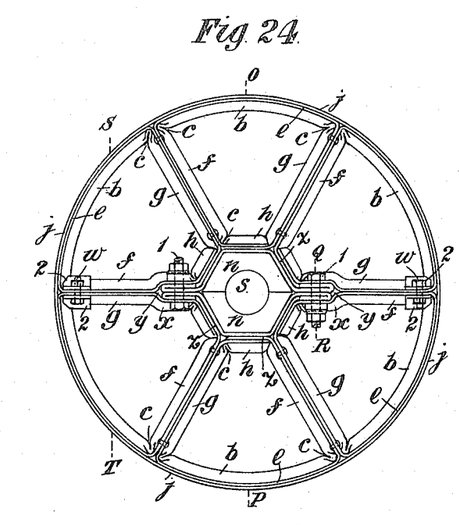
Fig. 24. is an elevation of a pulley constructed with a boss provided with an internal liner to which the "keystone" sections are bolted or riveted.

When the arms of the pulleys are fixed together, as a rule the portions $f$ and $g$ of the blank, which are at an angle to the curved periphery $e$, will form half of an arm with a central recess formed therein, and except when the rim $j$ is turned over the central arms of the pulley,—that is, where the pulley is split,—the flanged portions of each arm will come together and be riveted together at $v$, as shown in Figs. 10, 15, 19 and 21, or they may be bolted as shown at $w$, Fig. 24.

Figure 19:
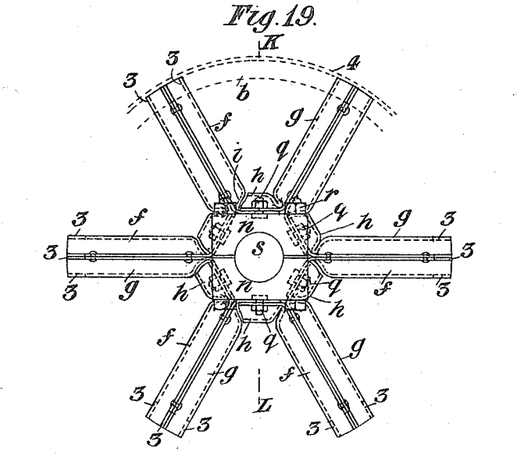
Fig. 19. is an elevation of a portion of a pulley showing the arms and boss, but with the rim portion of the "keystone" section cut away and the arms of the pulley formed for sections to fit therein.
Figure 20:
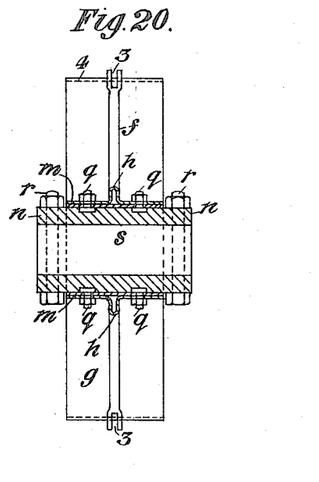
Fig. 20. is a sectional elevation on line K, L, Fig. 19.

When it is desired to make the rim to form, say the "keystone" section with its curved base or portion $e$ separate from the arms $f$ and $g$ and base $m$, then the arms are formed so that when two sections are brought together a recess 3, Figs. 19 and 20, is formed therein, that is to say, the hollow arms are made bifurcated at their upper ends to receive the central rib of the curved portion $e$, and if desired the said rib may be formed with projections to pass into the recess $d$ formed between the arms so as to enable them to be the more readily secured together; or a very deep rib $b$ may be provided. The rib may be bolted or riveted, or welded to the top of the arms. In this case instead of providing each section with a curved base $e$ one long piece of either sheet iron, stamped and formed to the shape of the perimeter of the periphery $j$, or a piece of rolled T iron may be employed in place thereof, and the portion 4 may be made of such a length so that when it is bent or formed into a circle its ends will cover the whole of the arms and the spaces between them, and the two ends will abut so as to be readily secured together by a plate, or plates, or to be welded in position.

Figure 21:
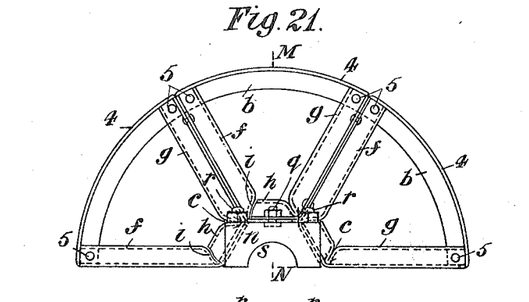
Fig. 21. is an elevation of half a pulley showing the arms and rims fixed in position.
Figure 22:
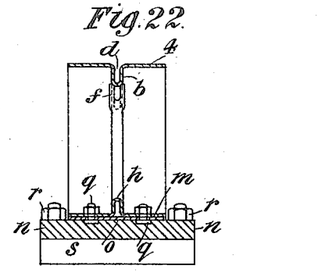
Fig. 22. is a section on line M, N, Fig. 21.
Figure 23:
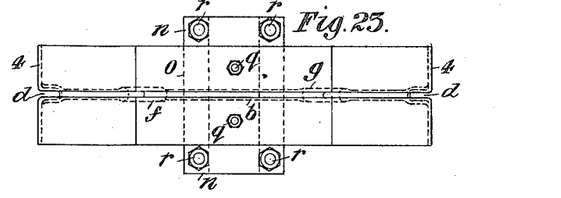
Fig. 23. is a plan looking on the top of Fig. 21.

It will readily be understood if the portion $j$ is to be applied to a split pulley, then the length of such piece will require to be sufficient to form, say, one-half of the pulley, and provision is then made for the ends being securely fastened together by bolts, or by welding, or other convenient means. When the said piece 4 is placed in position its central rib $b$ will pass within the recess 3 formed in the arms, and the flanged portion of the piece 4 will abut against the upper portion of the arms, and the rib $b$ is secured to the arms by rivets or bolts 5, as shown in Fig. 21.

Figure 25:
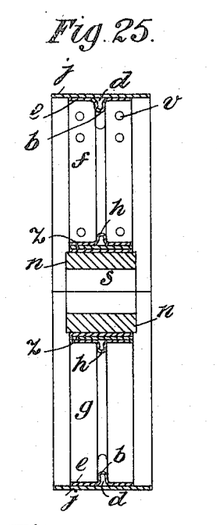
Fig. 25. is a sectional elevation on line O, P, Fig. 24.
Figure 26:
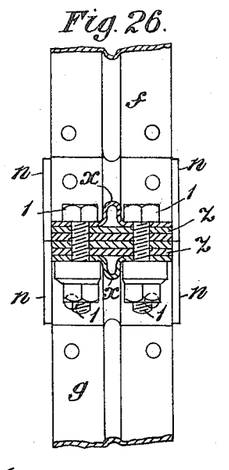
Fig. 26. is an enlarged sectional elevation on line Q, R, Fig. 24.
Figure 27:
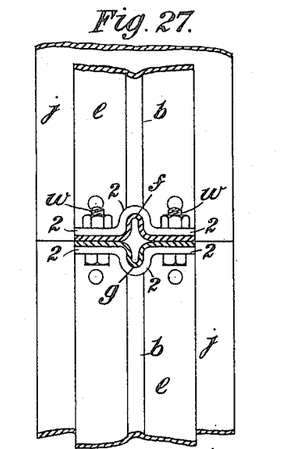
Fig. 27. is an enlarged part sectional elevation on line S, T, Fig. 24 looking to the left.

In some cases the arms at where the pulley and boss $n$ are split into, say, two portions may be formed as shown in Fig. 24. In this case the two portions of the arm that form the two arms where the pulley is jointed together may be enlarged at their inner ends as shown at $x$ in Fig. 24, so as to permit of a recess $y$ being formed between them so as to receive the turned over ends of a liner $z$, which liner is made to embrace the boss as shown in Fig. 24. A bolt 1 is made to pass through the folded ends of each of the liners and also through the flanges of the arms $f$ and $g$. At the opposite end of the said arms a plate 2 adapted to fit the flanges of the central rib $b$ of the arms is secured in position by the bolts $w$ to the flanged portion of the said arms, as shown in Figs. 24 and 27, and in this case the bolts are also made to pass through the flanges of the arms as well as through the plates 2. By means of the liner $z$ the two portions of the boss or hub $n$ are securely clamped together and prevented from opening out that would otherwise occur in the case of large pulleys, or pulleys upon which a great strain may be placed. In all other respects the pulley shown in Figs. 24 and 25 is of a similar construction to those shown in the previous figures.

In some cases, and particularly for large sized pulleys, it may be found advisable instead of forming the "keystone" sections as above described,—that is, in one portion,—to make each arm and portion of the base in one portion separate from the rim or curved base $e$. One half of the arm, and, say, one half of the base, may be formed each in one portion but separate from the said curved base, and if desired, the two portions of the said base $m$ may be welded together so as to hold the arms and base in position, but this welding will require to take place after the arm has been threaded through the holes or slots in the hereinafter described shroud. The arm portions of the "keystone" sections and their base whether formed in one part or in two, and when made of sheet metal, are stamped in a similar manner to that hereinbefore described. When this is done the arms are made to be slotted through apertures or holes 6 suitably shaped and formed for their reception in a loose and outer portion of the base hereinafter termed "the shroud 7." The shroud 7 is provided with a recess 8 on its under or inner surface to receive the projection 9 (Fig. 34) formed on the liner $z$ which, in this case, takes the form of a circular bush provided with a projection 9 (Fig. 32) of hexagonal shape. The liner $z$ and the shroud 7 are of the same axial length, the circular ends of the liner fitting into circular recesses formed for its reception in the said shroud, while the recess 8 in the shroud is shaped hexagonally to receive the projection 9 on the liner, see Fig. 29. The projection 9 is made of such a thickness that the inner arms or ends of the portion $m$ can pass between the inner surface of the recess 8 in the shroud 7 and the top of the projection 9 by which they are held securely in position.

It will readily be understood that the arms are threaded through openings 6 from the inner side of the shroud and when it is desired the two portions of each arm may be welded together, or they may simply be retained in position by means of the projection 9 pressing them against the inner surface of the recess 8 in the said shroud.

By the employment of a shroud made in two portions I am enabled to get the retaining bolts 1, 1, within the face of the pulley and very close to the arms, as shown in Figs. 28 and 30. The portion of the shroud through which the bolts pass is made thicker than the portion in which the recess 8 is formed. On reference to Figs. 29 and 36 it will readily be seen that in order to provide for the recess 8 a projecting rib is formed between the two elongated portions in which the circular ends of the liner $z$ are placed.

In Figs. 28, 30 and 32 the shroud and liner $z$ are shown made in two parts, or halves, or if desired, they may be made in a number of sections.

In the hollow U-shaped recesses, which are formed by the two arms of the "keystone" section being brought together, is inserted a suitably shaped block 10, as shown in Figs. 37 and 38. The block 10 is adapted to fit the inner contour of the arm. On one end of the block is formed a pin or projection 11 as shown in Figs. 37 and 39, or the pin 11 may be provided with a countersunk head adapted to fit a suitably shaped hole in the rim. The pin 11 is made to pass through the rim 4, or $j$, or both, of the pulley, and into each of the blocks may be formed a recess 12, into which the sides of the rib $b$ of each spoke may be pressed, as shown at 13, Fig. 28, or, if so desired, in place of the recess 12 a projection 14 is formed on each side of the block 10, as shown in Fig. 39, or, when preferred, rivets 15, Fig. 28, may be made to pass transversely through the rib $b$ of the arms and block 10, or the projection 14 may be arranged to extend the full length of the block and to be provided with recesses 12 therein, as shown in Figs. 46 and 47. A countersunk hole 23 is formed in the rim as shown in Fig. 49. When this form of block is employed the rim 4 of the pulley may either abut against the top of the arms and block inserted therein, as shown in Fig. 28, or as shown in Fig. 31 spaces may be provided in the central rib $b$ for the reception of the upper portion of the arms and block, and the rim 4 and additional rim $j$ would then be secured in position by means of the pin 11, which is shown in this figure to pass through both of the rims 4 and $j$ and to be riveted or otherwise secured on the outer surface. It will readily be understood that the rim 4 in this case may either be formed out of a strip of sheet metal or of T iron suitably rolled with the recesses formed therein for the reception of the ends of the spoke; the rim $j$ would be formed of a strip of sheet metal of any suitable length, width and thickness according to the size of the pulley and the width of its face. By letting the ends of the arms into the recesses formed for their reception in the ribs a very strong method of attaching them together is thereby provided.

Figure 40:
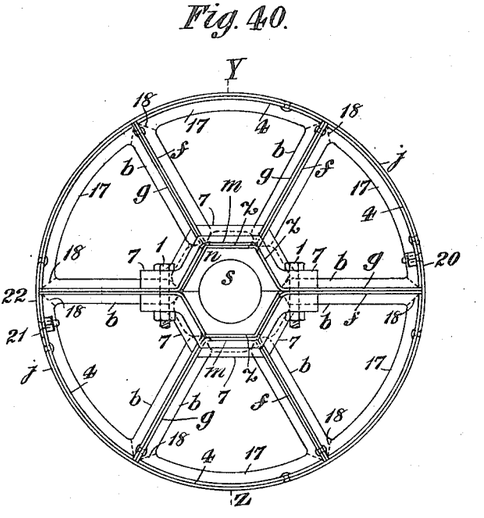
Fig. 40. is an elevation of a pulley with its sections formed on the "keystone" principle having the arms threaded through apertures in the boss, and retained in position by means of a shroud and also provided with an additional rim fixed to the peripheries of the sections.
Figure 41:
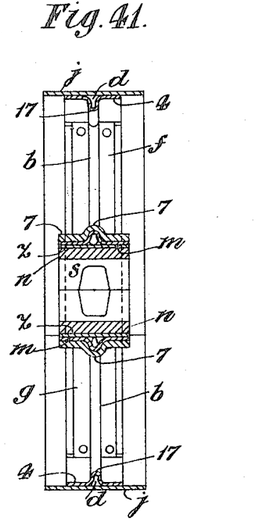
Fig. 41. is a section of the same on line Y, Z, Fig. 40.
Figure 42:
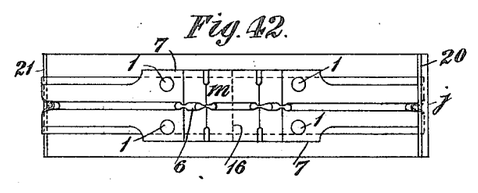
Fig. 42. is a plan of the pulley shown in Fig. 40 after the top half of the pulley has been removed.
Figure 43:
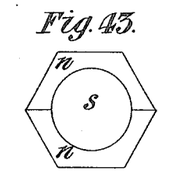
Fig. 43. is an elevation of the bush of the hub or boss shown at Fig. 40.
Figure 44:
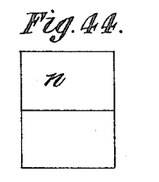
Fig. 44. is an elevation of the same.
Figure 45:
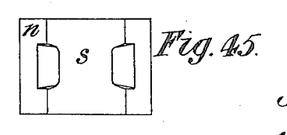
Fig. 45. is a plan of Fig. 43 after its upper portion has been removed.

In Figs. 40, and 42 is shown a pulley in which the rim 4 is made separate from the two arm portions $f$ and $g$ of the "keystone" section, and in which the portion $m$ of the "keystone" section is divided into two portions by any suitable means, and the ends thereof when placed in the recess 8 may either abut against each other, or be welded together along the dotted line 16, Fig. 42. When the curved rim 4 is made separate from the said arms it may be formed from a blank of sheet metal provided with a central rib 17, and the ends of the rib may be made angular at each end along the line 18 to fit a similar angular face on the rib $b$ of the arms. The angular faces of the arms may either be made to abut, or, if desired, they may be welded together by any suitable means along the line 18, or, if preferred a recess may be left between the two portions of the rib 17 in which case the arms may be made to come up to the flange or horizontal portion of the rim 4 in a similar manner to that shown in Fig. 31. Further, a liner $z$ may be made, say, of sheet metal stamped with a central rib adapted to fit into the recess formed in the portion $m$ of the "keystone" section, and the retaining bolts 1 are also made to pass through the said liner. In Figs. 40 and 41 the liner $z$ is shown to be hexagonal, and the circular portions and projection 9 are dispensed with, that is to say, when the circular ends of the liner are dispensed with the liner is made hexagonal for its full length.

The shroud 7 is provided with the hereinbefore mentioned holes or slots, or apertures 6 through which the arms are threaded. When an additional rim $j$ for a split pulley is employed, then the end of such additional rim is carried forward on one side above the half of the pulley so that the projecting end may rest upon, and overlap, the curved portion of the "keystone" section in the other half of the pulley. That is to say, as shown in Fig. 40, the end 20 of the additional rim $j$ is made to project above the upper half of the pulley and the end 21 on the opposite side does not extend to the top of the horizontal arm of the pulley so as to form a recess into which the projecting end 22 of the upper half of the pulley fits and overlaps one of the curved portions of the lower half of the said pulley. The additional rim $j$ is riveted to the curved portion 4 of the keystone section, but at the point at which they overlap the bases they may be bolted thereto, the heads of the bolt being let into countersunk holes in the additional rim $j$. When required solid forged arms for the pulley may be employed in place of arms formed by stamping in dies as hereinbefore described. In pulleys constructed with shrouds to inclose the base of each section the spokes will be supported in two directions, that is, as is usual by fastening with the shroud or boss, and also by continuing the spokes at suitable angles to the liner portions, and by the use of the forgings for connecting the upper end of the spokes together and uniting the hereinbefore mentioned two rims, very strong pulleys are produced which will stand a very severe strain which occurs when the pulleys are employed for driving purposes. Also a driving clamp hub is produced which acts as a centering device for arranging with accuracy the placing of each of the "keystone" sections, as well as a support for each arm in addition to the miter joint of the said section, whereby back lash or side play and the opening strain of the boss are prevented.

What I claim is:—

1. A pulley comprising a hub, spokes of cruciform cross-section independent of said hub, each of said spokes being formed of two plates of sheet metal with central ribs fastened together, a curved strip of like cross-section connecting the outer ends of adjacent plates of each two adjacent spokes, the inner ends of said adjacent spoke plates being turned toward each other, and binding means independent of said hub for said spokes to press said turned ends against the hub and hold them frictionally in position.

2. A pulley comprising a hub, spokes of cruciform cross-section independent of said hub, each of said spokes being formed of two plates of sheet metal with central ribs fastened together, the inner end of one plate of each spoke being turned toward a plate of the next adjacent spoke, said turned ends contacting, binding means independent of said hub, means for said spokes to press said turned ends against the hub and hold them frictionally in position against the outer face of said hub, and an integral curved segment extending between each of the outer ends of said adjacent plates of adjacent spokes, which segments collectively form a rim for the pulley.

3. A pulley comprising a hub, spokes of cruciform cross-section independent of said hub, each of said spokes being formed of two plates of sheet metal with central ribs fastened together, the inner end of one plate of each spoke being turned toward a plate of the next adjacent spoke, said turned ends contacting, binding means independent of said hub for applying pressure to said turned ends to hold them frictionally against the outer face of the hub, a curved segment extending between each of the outer ends of adjacent plates of adjacent spokes, which segments collectively form a rim for the pulley, and an outer encircling rim surrounding said curved segments and firmly connected thereto.

4. A pulley comprising a hub having a plurality of flat peripheral faces, spokes of cruciform cross-section each formed of two plates of sheet metal with central ribs fastened together in a radial plane transverse to the plane of the pulley, the inner ends of said connected spoke plates being turned in opposite directions to bear against the outer flat faces of the hub, and a shroud through which said spokes project surrounding said hub and the turned ends of the spoke plates to press said ends against the hub and hold them immovably in position.

5. A pulley comprising a hub formed with a plurality of flat peripheral faces, a shroud surrounding said hub, spokes formed each of two plates of sheet metal connected together in radial planes and projecting through said shroud, the inner ends of the plates of each spoke being bent in opposite directions to contact like ends of adjacent spoke plates on each side and held immovably in frictional engagement with the flat hub faces by said shroud, integral curved segments extending between the outer ends of the facing spoke plates of adjacent spokes to form collectively a rim, and a supplemental rim surrounding said segments and rigidly secured thereto, said rim assisting the shroud to hold the spokes in place.

6. In a pulley, a hub comprising a polygonal boss, a shroud surrounding said boss, spokes of cruciform cross-section passing through said shroud, each spoke being formed of two plates of sheet metal with central ribs joined together in planes radial to the axis of the hub, and a curved segment connecting a plate of each spoke at its outer end to a plate of an adjacent spoke, said plate having its inner end turned laterally and contacting the like turned end of said adjacent spoke plate and disposed between the polygonal faces of said boss and the shroud, and held immovably in frictional engagement against said faces of said shroud.

7. In a pulley, a hub comprising a polygonal boss, a liner surrounding said boss and bearing on the polygonal faces of the same, a divided shroud over said liner, spokes of cruciform cross-section each formed of two plates of sheet metal connected together in planes radial to the axis of the hub and projecting through openings in the shroud, a curved segment extending between and connecting the outer ends of a plate of each adjacent pair of spokes, the inner ends of said plates being bent in opposite directions to contact similarly bent ends of adjacent spoke plates on each side, and held against the flat faces of said liner by the shroud, means for fastening the parts of the shroud together, said means also serving to clamp the shroud, the inner bent ends of the spokes and the liner firmly about the boss, and a rim surrounding said curved segments and connected thereto.

8. A pulley comprising a hub having a polygonal central portion, spokes of cruciform cross-section each formed of two plates of sheet metal with central ribs fastened together, the inner ends of said plates of each spoke being turned in opposite directions and contacting similarly turned ends of the plates forming adjacent spokes, said plate ends bearing upon and being supported by the polygonal faces of said hub, means for frictionally holding said plate ends in position against the hub, and a rim surrounding the outer ends of the spokes.

9. In a pulley, a hub comprising a polygonal boss, a divided liner spaced to and surrounding said boss, spokes formed each of two plates of sheet metal fastened together in planes perpendicular to the plane of the wheel, their inner ends being bent in opposite directions and bearing on the flat faces of said liner, fastening means passing through certain of the spokes and the liner to clamp the same on the boss, and a rim surrounding the outer ends of the spokes.

10. In a pulley, a hub comprising a polygonal boss, a divided liner of similar shape surrounding said boss, a divided shroud around said liner, spokes formed each of two plates of sheet metal fastened together in planes perpendicular to the plane of the wheel, the inner ends of the two plates of each spoke being bent in opposite directions and contacting and bearing on the sides of said liner, fastening means extending through the shroud for securing the parts thereof together and to clamp the spokes and the liner against the boss, and a rim surrounding the outer ends of the spokes.

11. A pulley comprising a hub, spokes of cruciform cross-section independent of and radiating from said hub, the inner ends of which spokes are bent laterally and bear on the periphery of the hub, a rim surrounding the outer ends of the spokes, a shroud detachable from the spokes and through which the spokes are passed, and binding means independent of said hub for clamping said shroud on the hub to frictionally hold said inner ends of the spokes between the inner surface of said shroud and the outer surface of said hub.

12. A pulley comprising a hub, a rim, spokes between the hub and the rim, the inner ends of which spokes are bent laterally to bear upon the surface of the hub, a divided shroud detachable from the spokes and through openings in the periphery of which said spokes are passed, and binding means independent of said hub for fastening the parts of the shroud around the hub to clamp and hold the turned ends of said spokes frictionally against the periphery thereof.

13. A pulley comprising a plurality of independent spokes, curved strips connecting the outer ends of the spokes, a separate hub independent of said spokes, said spokes having their inner ends bent laterally and adapted to abut against said hub, and binding means independent of said hub and detachable from said spokes to detachably hold the outturned ends of the spokes against said hub.

14. In a pulley, a hub, a plurality of independent spokes independent of said hub, having the ends thereof bent laterally, said ends being adapted to abut against said hub, and binding means detachable from said spokes and independent of said hub for frictionally holding said inner ends against said hub.

15. A pulley comprising a hub formed with a plurality of flat peripheral faces, a rim, spokes separable from said hub between the same and said rim, said spokes each being formed of two plates connected together in a radial plane, the inner end of one plate of each spoke being turned toward the plate of the adjacent spoke and being adapted to abut against one of the faces of said hub, and binding means independent of said hub for clamping and frictionally holding said ends in position against said faces.

JOHN HENRY MORGAN.

Witnesses:
 ERNOLD SIMPSON MOSELEY,
 MALCOLM SMETHURST.